United States Patent [19]

Sakaki et al.

[11] Patent Number: 5,303,614
[45] Date of Patent: Apr. 19, 1994

[54] SHIFT CONTROL SYSTEM FOR AUTOMATIC TRANSMISSION

[75] Inventors: Minji Sakaki; Masaharu Sakoda, both of Hiroshima; Kyosuke Mori, Kitakyushu, all of Japan

[73] Assignee: Mazda Motor Corporation, Hiroshima, Japan

[21] Appl. No.: 952,402

[22] Filed: Sep. 30, 1992

[30] Foreign Application Priority Data

Sep. 30, 1991 [JP] Japan .................. 3-252440

[51] Int. Cl.$^5$ .................................. F16H 59/16
[52] U.S. Cl. .................................. 74/866
[58] Field of Search ............... 74/866; 364/424.1

[56] References Cited

U.S. PATENT DOCUMENTS

| | | | |
|---|---|---|---|
| 4,106,368 | 8/1978 | Ivey | 74/866 |
| 4,220,058 | 9/1980 | Petzold | 74/866 |
| 4,799,158 | 1/1989 | Patil | 364/424.1 |
| 4,855,914 | 8/1989 | Davis et al. | 364/424.1 |
| 4,981,053 | 1/1991 | Yamaguchi | 74/866 |
| 4,982,621 | 1/1991 | Sano | 74/866 |
| 5,047,936 | 9/1991 | Ishii et al. | 364/424.1 |
| 5,063,814 | 11/1991 | Baba et al. | 74/866 |
| 5,086,670 | 2/1992 | Nitz et al. | 74/866 |
| 5,151,858 | 9/1992 | Milunas et al. | 364/424.1 |
| 5,241,477 | 8/1993 | Narita | 364/424.1 |

FOREIGN PATENT DOCUMENTS

62-41458  2/1987  Japan .

*Primary Examiner*—Dirk Wright
*Attorney, Agent, or Firm*—Keck, Mahin & Cate

[57] ABSTRACT

An automatic transmission shift control system controls a line pressure for initiating a shift of an automatic transmission so that a duration between initiation of the shift and termination of a torque decline during the shift falls within a predetermined shift initiation time period. Also, a line pressure is controlled by the system for terminating a shift of the automatic transmission so that a duration between termination of a torque decline and termination of the shift falls within a predetermined shift termination time period. Both of the line pressures are used in a following shift control of the automatic transmission.

7 Claims, 11 Drawing Sheets

SHIFT CONTROL SYSTEM FOR AUTOMATIC TRANSMISSION

BACKGROUND OF THE INVENTION

1. Field of the Invention

The present invention relates to a shift control system for an automatic transmission for an automobile which causes the automatic transmission to shift based on torque input to or output from the automatic transmission. More particularly, this invention relates to such an automatic transmission shift control system in which an automatic transmission shifts while producing less of a shift shock which is physically felt by passengers.

2. Description of Related Art

Automatic transmissions with torque converters for automotive vehicles typically perform shift operations in two consecutive phases. These phases include a torque shift phase and an inertia shift phase. Because little drop in turbine speed takes place in the torque shift phase, the automatic transmission is not subjected to shift shock in the torque shift phase. However, in the inertia phase, in which discharge of inertial energy takes place due to a change in gear ratio, the speed of the turbine goes down rapidly, and the automatic transmission is subjected to shift shock.

One technique to prevent an occurrence of shift shock during shifting is to monitor the output torque of the automatic transmission to lower a line pressure supplied to the automatic transmission at the moment the output torque converts to an increasing condition from a decreasing condition. Such a shift shock control technique is known from, for instance, Japanese Unexamined Patent Publication No. 62-41,458.

It has been found that an actual input torque supplied to an automatic transmission undergoes complicated changes. It is, therefore, difficult to eliminate or reduce shift shock by regulating a line pressure during a transition of the shift operation into an inertia phase which is detected based only on a change in torque.

Figure 1:
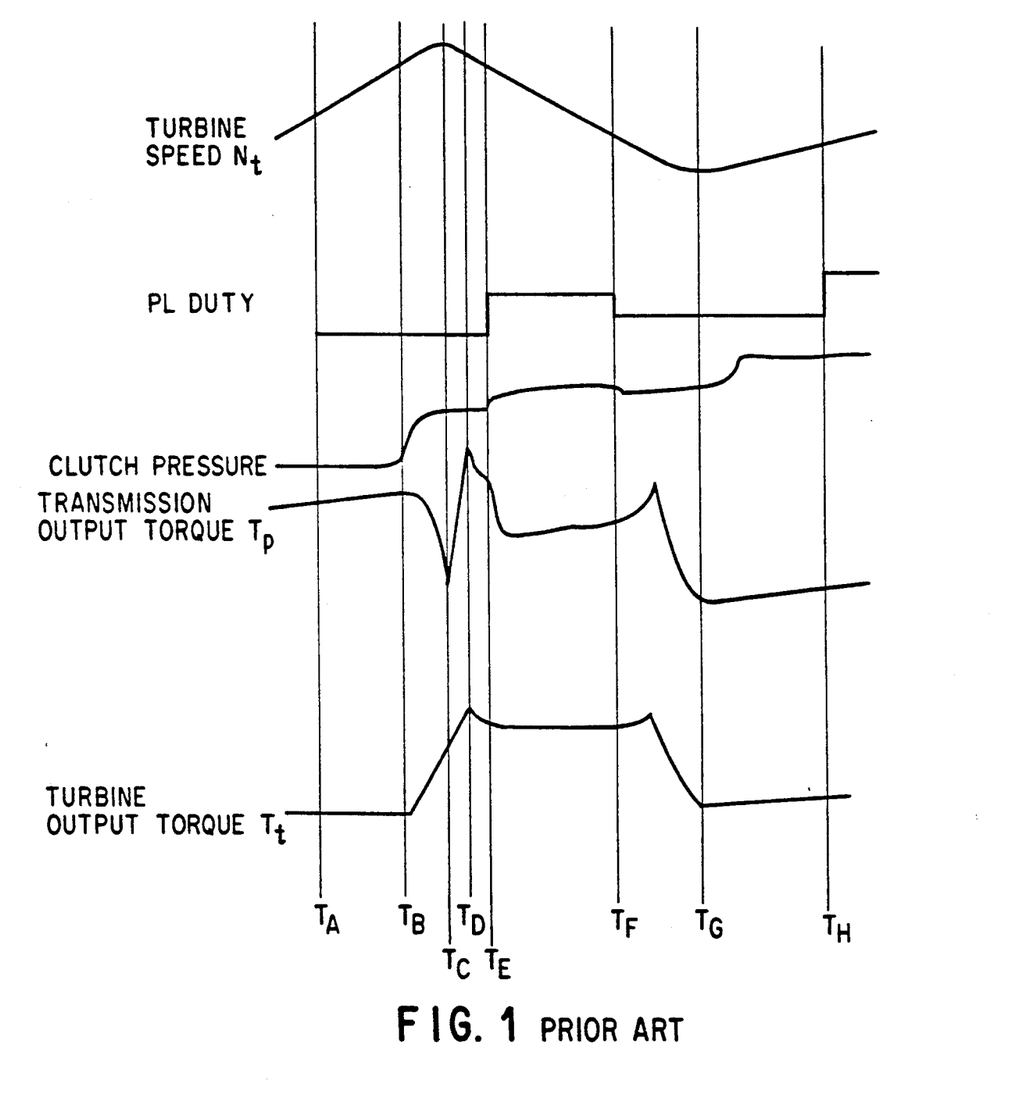
FIG. 1, as noted above, is an explanatory time chart of various control and controlled factors of a known shift control system.

FIG. 1 provides a brief background that will enhance an understanding of the operation of the shift control system in accordance with the present invention. More specifically, FIG. 1 is a time chart for various transmission control factors, such as a turbine speed $N_t$ of a torque converter, a line pressure (PL) duty control, a clutch pressure CL supplied to a clutch chamber, an output torque $T_P$ of an automatic transmission, and a turbine output torque $T_t$ of the torque converter. When the automatic transmission begins a shift at a time $T_A$, a turbine output torque $T_t$, transmitted to a transmission mechanism of the automatic transmission, is provided as an output torque $T_P$ of the automatic transmission and transmitted to drive wheels through a propeller shaft. Shift shock, physically felt by passengers, is produced by a steep decline in transmission output torque $T_P$ in a time period between times $T_B$ and $T_D$ during shifting. This time period changes due to wearing of frictional coupling elements of the automatic transmission and is different for various automatic transmissions. In order to effectively prevent shift shock from occurring, it is not sufficient to simply reduce the amplitude of such a steep decline in transmission output torque.

SUMMARY OF THE INVENTION

It is an object of the present invention to provide a shift control system for an automatic transmission in which a line pressure is controlled so that a time period during which a steep torque decline occurs is within predetermined allowable limits. As a result, passengers do not physically feel the steep torque decline as a shift shock.

The foregoing object of the present invention is achieved by providing a shift control system of an automobile automatic transmission which hydraulically shifts, in predetermined shift patterns, according to vehicle operating conditions. The shift control system includes a torque detecting means for preferably detecting an input torque, or otherwise an output torque, of the automatic transmission while the automatic transmission performs a specific shift pattern. The torque detecting means detects the beginning of the specific shift pattern and termination of a decline in output torque based on a change in the detected torque. A line pressure for an initiation stage of the specific shift pattern is controlled based on a line pressure in a previous shift control so that a duration time between the initiation of the specific shift pattern and the termination of the torque decline in the previous shift control falls within a predetermined shift initiation time period in a current shift control.

Specifically, the shift control system detects a shift initiation time, at which initiation of the specific shift pattern takes place, and a decline termination time, at which the termination of the decline in output torque takes place. A time difference between the decline termination time and the shift initiation time is calculated as the duration time. Otherwise, the shift control system controls a line pressure so that the specific shift pattern starts to change a change rate of an input torque and the duration time falls within the predetermined shift initiation time period.

The shift control system further detects termination of the specific shift pattern and corrects a shift termination line pressure so that a duration time between the termination of a torque decline and the termination of the specific shift pattern falls within a predetermined shift termination time period in the following shift of the automatic transmission.

BRIEF DESCRIPTION OF THE DRAWINGS

The above and other objects and features of the present invention will be clearly understood from the following description of preferred embodiments thereof when considered in conjunction with the drawings, in which.

DESCRIPTION OF THE PREFERRED EMBODIMENTS

The following description is of an automatic shift control system in accordance with preferred embodiments of the present invention in which (1) a turbine output torque is monitored so that a line pressure for the automatic transmission is controlled with high accuracy; (2) initiation of a shift of the automatic transmission, a termination of a steep decline of a transmission output torque, and a termination of the shift of the automatic transmission are detected precisely by processing a signal representative of the turbine output torque; (3) an initial line pressure is controlled so that a duration time between the initiation of a shift and the termination of a steep decline of the transmission output torque falls within a predetermined shift initiation period; and (4) a terminal line pressure is controlled so that a duration time between the termination of a steep decline of the transmission output torque and the termination of the shift fall within a predetermined shift termination period.

Figure 2:
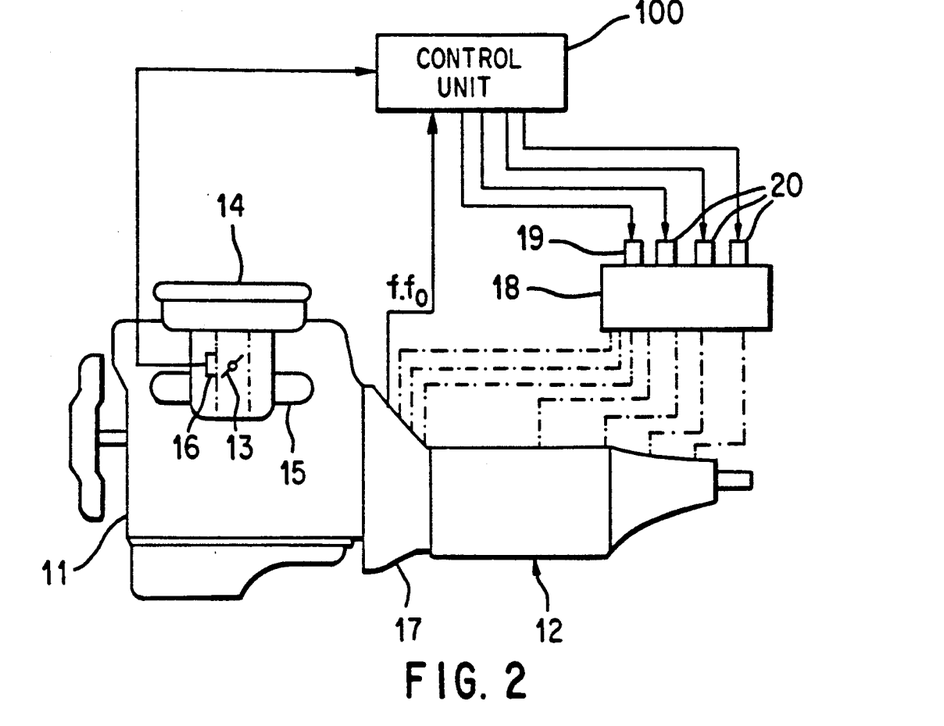
FIG. 2 is a schematic illustration of an automatic transmission shift control system in accordance with a preferred embodiment of the present invention.

FIG. 2 shows an engine 11 and an automatic transmission 12, which is controlled by means of a shift control system in accordance with a preferred embodiment of the present invention. The engine is provided with an intake system including an air cleaner 14, an intake manifold 15 connected with the air cleaner 14 through an intake pipe 15a, and a throttle valve 13 disposed in the intake pipe 15a. An opening sensor 16 is associated with the throttle valve 13 for detecting an opening of the throttle valve. The automatic transmission 12 is operationally connected with the engine 11 through a torque converter 17, which is of a well known type of torque converter, and, if necessary, may be equipped with a lock-up clutch. Engine output is transmitted to the automatic transmission 12 by the torque converter 17.

The automatic transmission 12 includes, as a supplemental transmission means, a planetary gear type of transmission mechanism, provided with frictional coupling elements such as multi-plate clutches and band brakes. These frictional coupling elements and a lock-up clutch of the torque converter 17 are activated by various hydraulic cylinders and control valves, provided as a control valve unit 18, which are activated by a hydraulic pressure control system. The hydraulic pressure control system will be described later in conjunction with FIG. 7. To summarize at this point, the control valve unit 18 is provided with a hydraulic pressure control system, including a duty solenoid valve 19 for controlling a line pressure supplied to the hydraulic cylinders, and a plurality of shift solenoid valves 20. These shift solenoid valves 20 are selectively operated to connect a supply of line pressure to and disconnect the supply of line pressure from the respective hydraulic cylinders. The control valve unit 18, the duty solenoid valve 19 and the shift control valves are, in practice, built into the automatic transmission 12.

Figure 3:
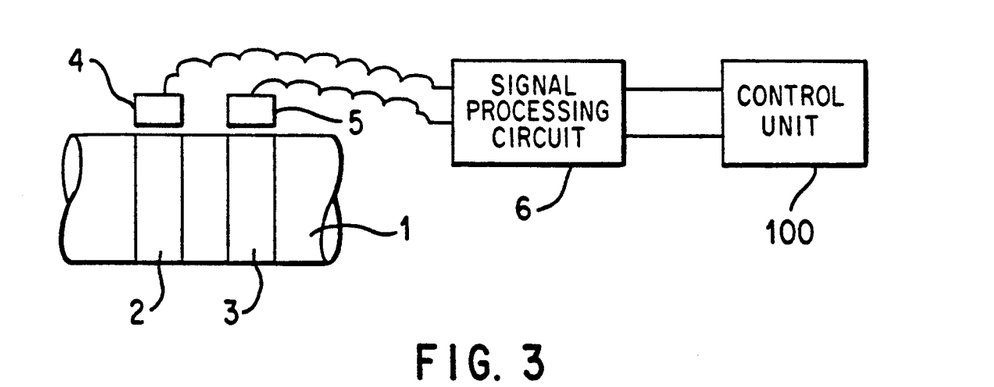
FIG. 3 is a schematic illustration of a torque sensor used in the automatic transmission shift control system of FIG. 2.

FIG. 3 shows a torque sensor for use with the automatic transmission shown in FIG. 2. As FIG. 3 shows, the torque sensor cooperates with a rotary shaft 1 made of a steel material. The rotary shaft 1 is provided with first and second recording means, such as magnetic recording layers 2 and 3, separated at a distance in an axial direction of the rotary shaft 1. Adjacent to the respective magnetic recording layers 2 and 3, first and second magnetic heads 4 and 5 are finally provided. A signal processing circuit 6 receives signals picked up by the first and second magnetic heads 4 and 5 and provides a control unit 100 with control signals.

Figure 4:
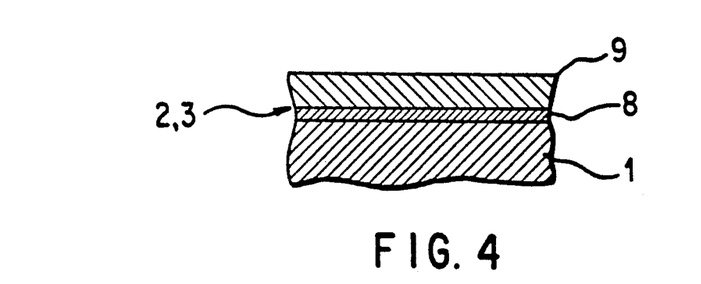
FIG. 4 is a sectional view showing a magnetic recording layer of the torque sensor of FIG. 3.

Each of the first and second magnetic recording layers 2 and 3 includes a non-magnetic substance layer 8 coated around the rotary shaft 1 and a magnetic substance layer 9 coated around the non-magnetic layer 8. The non-magnetic substance layer 8, which is formed by injecting a molten metal substance, such as aluminum or an aluminum alloy, prevents leakage of magnetic flux into the rotary shaft 1 when the magnetic heads 4 and 5 record signals on the magnetic substance layers 9. On each magnetic substance layer 9, which is formed by injecting a molten metal substance, such as an iron oxide including primarily $Fe_3O_4$, signals representative of circumferential positions of the rotary shaft 1 are magnetically recorded. The first and second magnetic heads 4 and 5, which are of a read-write type, magnetically record or write the circumferential positional signals on the first and second magnetic recording layers 2 and 3, respectively, at specific frequencies, and magnetically read the circumferential positional signals.

The signal processing circuit 6 includes a torque operation circuit and a rotational speed operation circuit. The torque operation circuit produces an output torque $T_t$ of the rotary shaft based on reproduced positional signals read out by the magnetic heads 4 and 5. The rotational speed operation circuit produces a rotational speed $N_t$ based on a phase difference between reproduced position signals read out by the magnetic heads 4 and 5. Signals representative of the output torque $T_t$ and rotational speed $N_t$ of the rotary shaft 1 are sent to the control unit 100 and, based on the signals, the control unit 100 performs various controls, such as an automatic shift control of the automatic transmission, a line-pressure control and a shift shock relief control.

Figure 5:
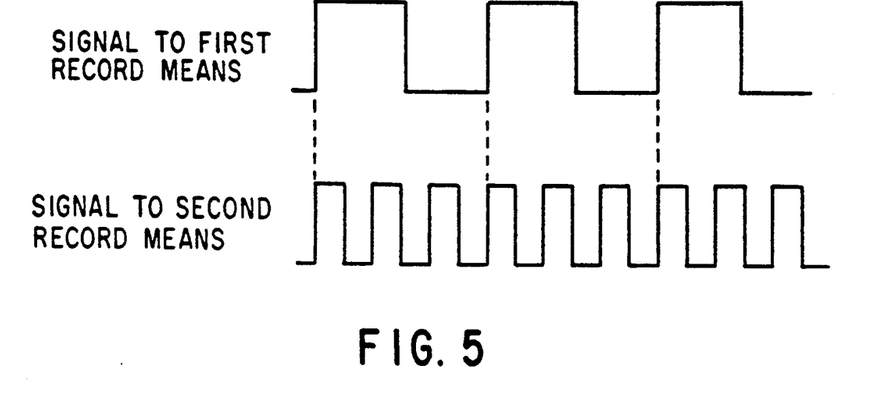
FIGS. 5 and 6 are diagrams showing output signals from the torque sensor.
Figure 6:
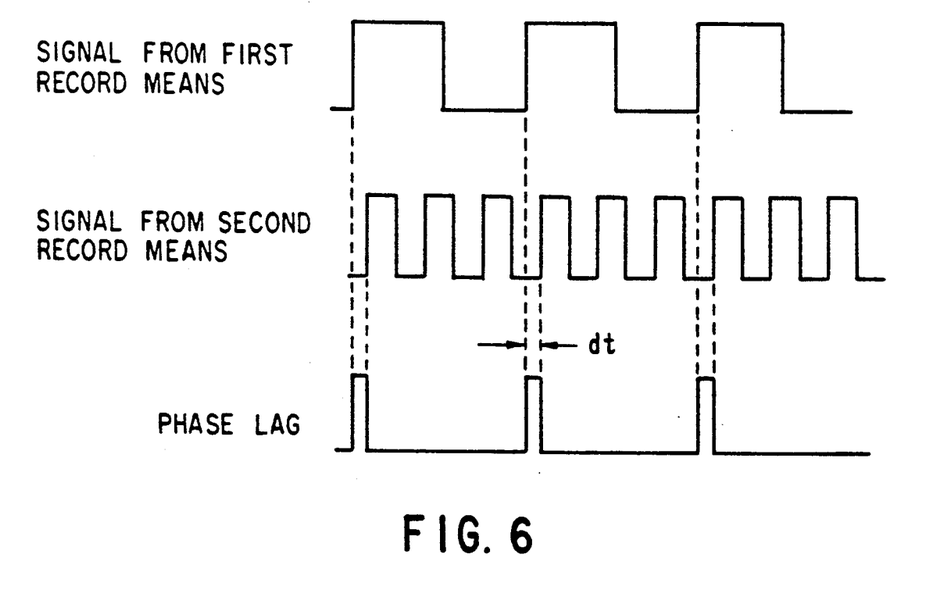

Specifically, the first and second magnetic heads 4 and 5 generate signals having frequencies different from each other. As shown in FIG. 5, the signal from the magnetic head 4 has a frequency lower than the signal from the magnetic head 5. While the rotary shaft is not subjected to any torque, the magnetic heads 4 and 5 record the signals on the first and second magnetic recording layers 2 and 3, respectively, as position signals which are in phase. When a torque acts as a load on the rotary shaft 1, the rotary shaft 1 is twisted and subjected to a torsion. As a result, a phase lag between positional signals detected by the magnetic heads 4 and 5 occurs, as shown in FIG. 6. The phase lag dt is proportional to torsion of the rotary shaft 1 and, therefore, a torque acting on the rotary shaft 1. Torque $T_t$ acting on the rotary shaft 1 is calculated from the following formula:

$$T_t = \pi^2 \times G \times d \times dt \times N_t / 16L;$$

wherein
G is the elastic coefficient of the rotary shaft 1;
d is the radius of the rotary shaft 1;
dt is the phase lag between positional signals detected by the heads 4 and 5;
$N_t$ is the speed of rotation of the rotary shaft 1; and
L is the axial distance between the first and second magnetic recording layers 2 and 3.

The speed of rotation $N_t$ of the rotary shaft 1 is calculated from the following formula:

$$N_t = N_0 \times f/f_0;$$

wherein $N_0$ is the speed of rotation of the rotary shaft 1 when a positional signal is recorded at a frequency of f and $f_0$ is a reproduced frequency of the positional signal.

Figure 7:
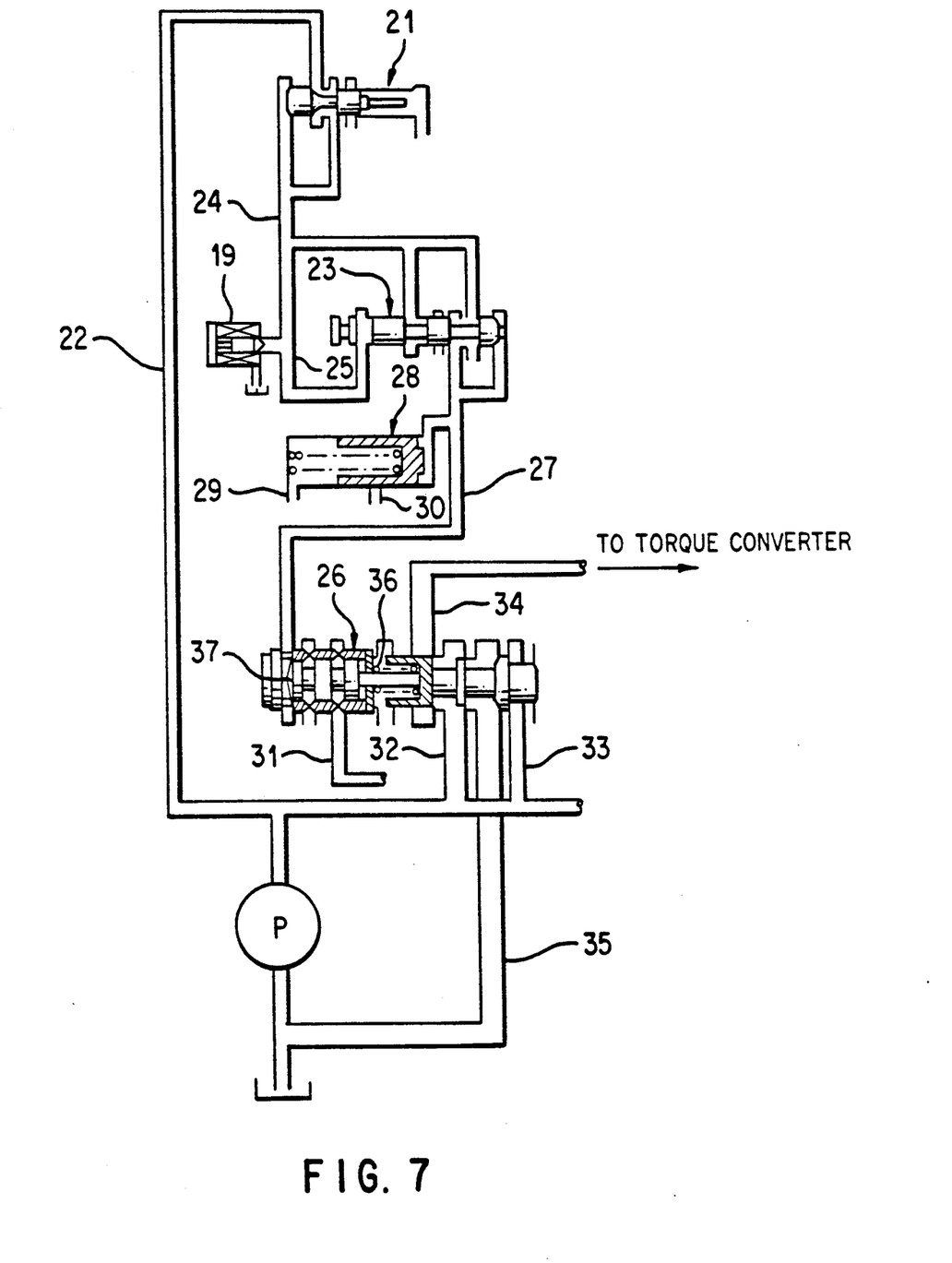
FIG. 7 is a hydraulic pressure circuit used in the automatic transmission shift control system of FIG. 2.

FIG. 7 shows the hydraulic pressure control system for controlling a line pressure so as to selectively activate the frictional coupling elements of the automatic transmission 12 and a lock-up clutch of the torque converter 17. The illustrated hydraulic pressure control system includes a hydraulic pump P, which is operated by the engine 11, a pressure reducing valve 21, a duty solenoid valve 19 and a line pressure control valve 26. The pressure reducing valve 21 reduces a line pressure, discharged into a line pressure line 22 by the hydraulic pump P, to a predetermined level. The reduced line pressure is delivered into a pressure line 24. The duty solenoid valve 19 regulates the reduced line pressure in the pressure line 24 at a duty rate so as to provide a pilot pressure acting on a modulator valve 23 through a pilot pressure line 25. The modulator valve 23 modulates pressure according to the pilot pressure and provides a modulated pressure acting, as a pilot pressure, on the line pressure control valve 26 through a pilot pressure line 27. According to the pilot pressure modulated by the modulator valve 23, the line pressure control valve 26 controls the line pressure in the line pressure line 22 to an optimum level for actuating hydraulic cylinders so as to selectively lock and unlock necessary frictional coupling elements and provide a desired gear. In order to supply a stable pilot pressure to the line pressure control valve 26, the pilot pressure line 27 is provided with an accumulator 28 for removing pulsations in the pilot pressure in the pilot pressure line 27. The accumulator 28 has a drain port 29 and a pressure relief port 30 functioning as a relief valve. The line pressure control valve 26 selectively connects the line pressure line 22 with and disconnects the line 22 from various pressure lines, such as a pressure reverse line 31 connected to a manual shift valve (not shown), first and second line pressure lines 32 and 33 for supplying pressure to the hydraulic cylinders for the frictional coupling elements, a pressure line 34 for supplying a pressure to the torque converter 17, and a drain line 35.

In the hydraulic pressure control system, when the engine 11 stops and the oil pump P is not actuated, no line pressure acts on the line pressure control valve 26. If in fact no pressure acts on the line pressure control valve 26, a spool 37 is urged so as to move by a return spring 36. Consequently, the line pressure control valve 26 disconnects the supply of pressure to the torque converter 17 through the pressure line 34. Once the engine 11 starts to operate and hence the oil pump P is operated, the line pressure acts on the spool 37 through the first line pressure line 32 and forces the spool 37, for instance, toward the left, as viewed in FIG. 7, against the return spring 36. The pilot pressure is supplied to the line pressure control valve 26 through the pilot pressure line 27. As a result, the line pressure control valve 26 connects a supply of pressure to the torque converter 17 through the pressure line 34. With an increased opening of the throttle valve 13, the engine 11 speeds up and consequently increases the line pressure in the line pressure line 22. This forces the spool 37 even more to the left against the return spring 36 and the pilot pressure supplied through the pilot pressure line 27 so as to communicate the first line pressure line 32 with the drain line 35. The line pressure in the first line pressure line 32 is drained through the drain line 35. As a result, the line pressure balances the combined pressures provided by the pilot pressure acting on the spool 37 through the pilot pressure line 27 and the force of the return spring 36. Since the pilot pressure acting on the spool 37 is regulated according to the duty rate of the duty solenoid 19, controlling the duty rate of the duty solenoid valve 19 by the control unit 100 regulates the line pressure.

Figure 8:
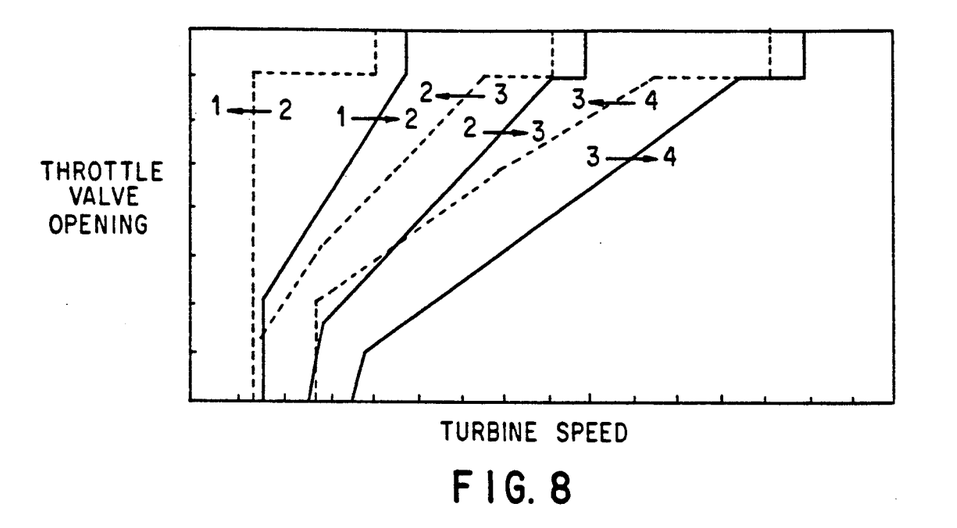
FIG. 8 is an illustration showing automatic shift control patterns.
Figure 9:
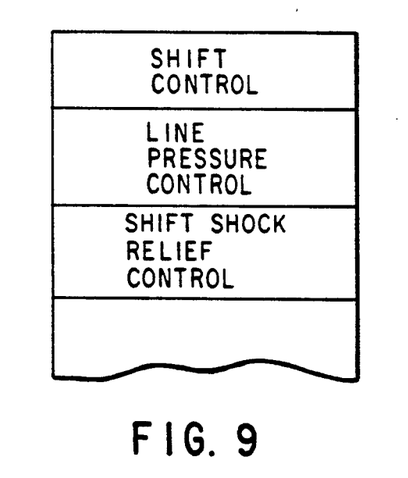
FIG. 9 is an explanatory illustration showing various controls performed by a control unit of the automatic transmission shift control system.

The control unit 100 includes a microcomputer, having a central processing unit, a read only memory (ROM) and a random access memory (RAM), an input-output interface, an analog-digital converter, a wave form shaping circuit, a drive circuit for driving the shift solenoid valves 20, and a drive circuit for driving the duty solenoid valve 19. Various control sequence routines, such as an automatic shift control sequence, a line pressure control sequence and a shift shock control sequence, are programmed into the microcomputer. The automatic shift control is performed by controlling the shift control valves 20 according to shift control schedules shown in FIG. 8 which are selected based on throttle opening and turbine speed. Automatic shift control by the use of such shift control schedules is well known to those in the art.

The line pressure control is performed by controlling the duty rate of the duty solenoid valve 19 so as to provide a line pressure PL calculated from the following formula:

$$PL = K_1 \times T_t + K_2 \times N_t + K_3;$$

wherein $K_1$, $K_2$ and $K_3$ are constants, $T_t$ is the torque acting on the rotary shaft 1, and $N_t$ is the speed of rotation of the rotary shaft 1.

In this embodiment, the line pressure control is performed independently to keep a duration time between the start of shifting ($T_B$) and the end of a steep torque decline ($T_D$) constant and to keep a duration time between the end of a steep torque decline ($T_D$) and the end of shifting ($T_D$) constant. Consequently, a line pressure $PL_{BD}$ for the constant time between the start of shifting ($T_B$) and the end of a steep torque decline ($T_D$) and a line pressure $PL_{DF}$ for the constant time between the end of a steep torque decline ($T_D$) and the end of shifting ($T_G$), which are independent and different from each other, are used as the line pressure PL.

Figure 10:
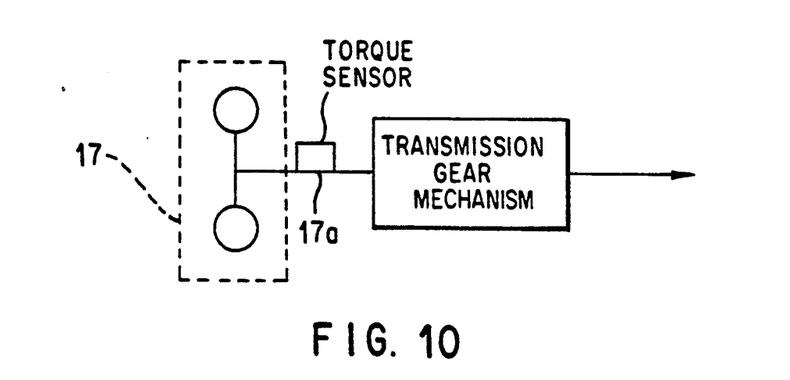
FIG. 10 is an illustration showing an arrangement of the torque sensor.

As shown in FIG. 10, in practice, the torque sensor TS is provided so as to cooperate with the turbine shaft 17a of the torque converter 17, which is an input shaft of the automatic transmission 12. Otherwise, the torque sensor TS may cooperate with an output shaft of the automatic transmission 12. However, because a torque $T_P$ of the output shaft changes sluggishly, as shown in FIG. 12, in order to detect an inflection point with certainty, it is undesirable to use the torque $T_P$ of the output shaft.

Figure 12:
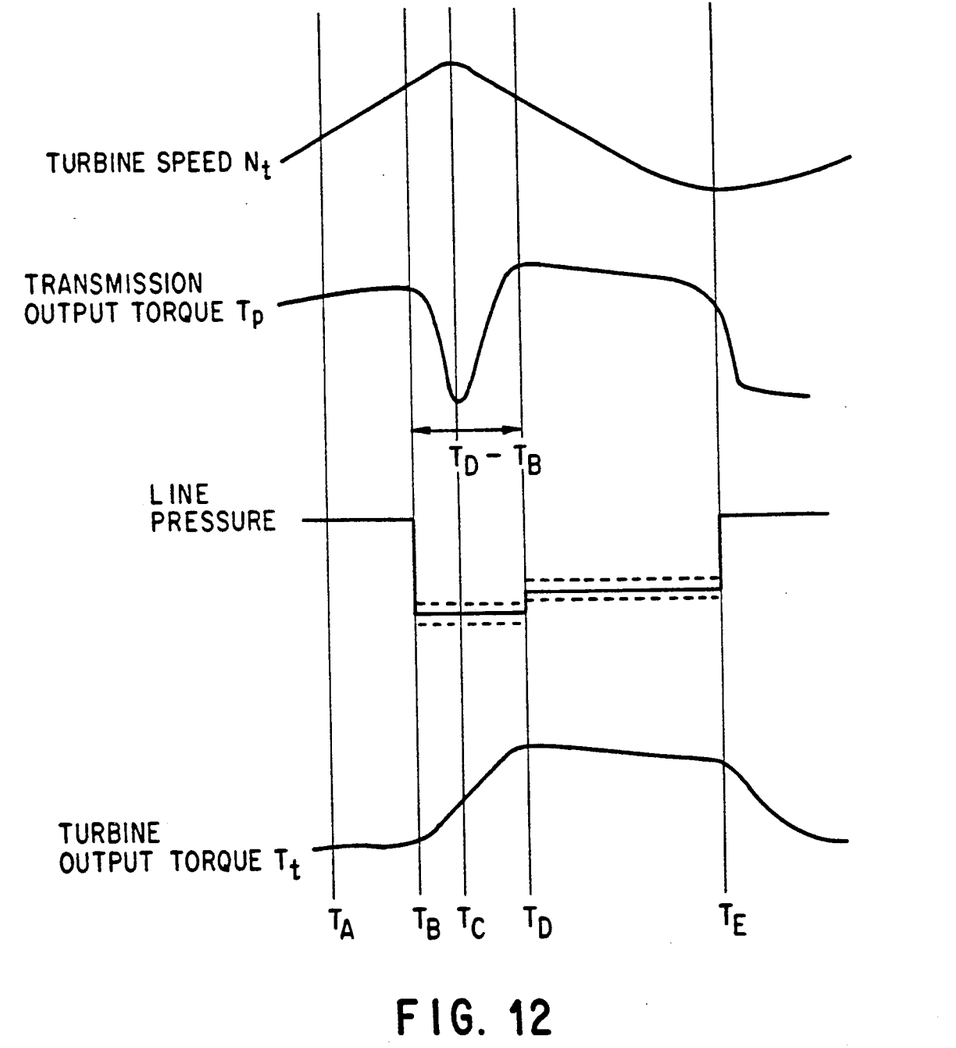
FIGS. 12 and 13 are time charts of various control and controlled factors of the automatic transmission shift control system.

As FIG. 12 shows, after a shift instruction is provided at a duration time $T_A$, a turbine torque $T_t$ begins to rise rapidly at a time $T_B$. This is because the automatic transmission 12 performs a shift operation and decreases a load applied thereto. Therefore, the automatic transmission 12 is considered to start to shift at the inflection of the turbine torque curve which occurs at the time $T_B$. In other words, the automatic transmission 12 is judged to start its shift operation when a rate of torque change $dT_t/dt$ becomes equal to or larger than a predetermined threshold value a.

Figure 11:
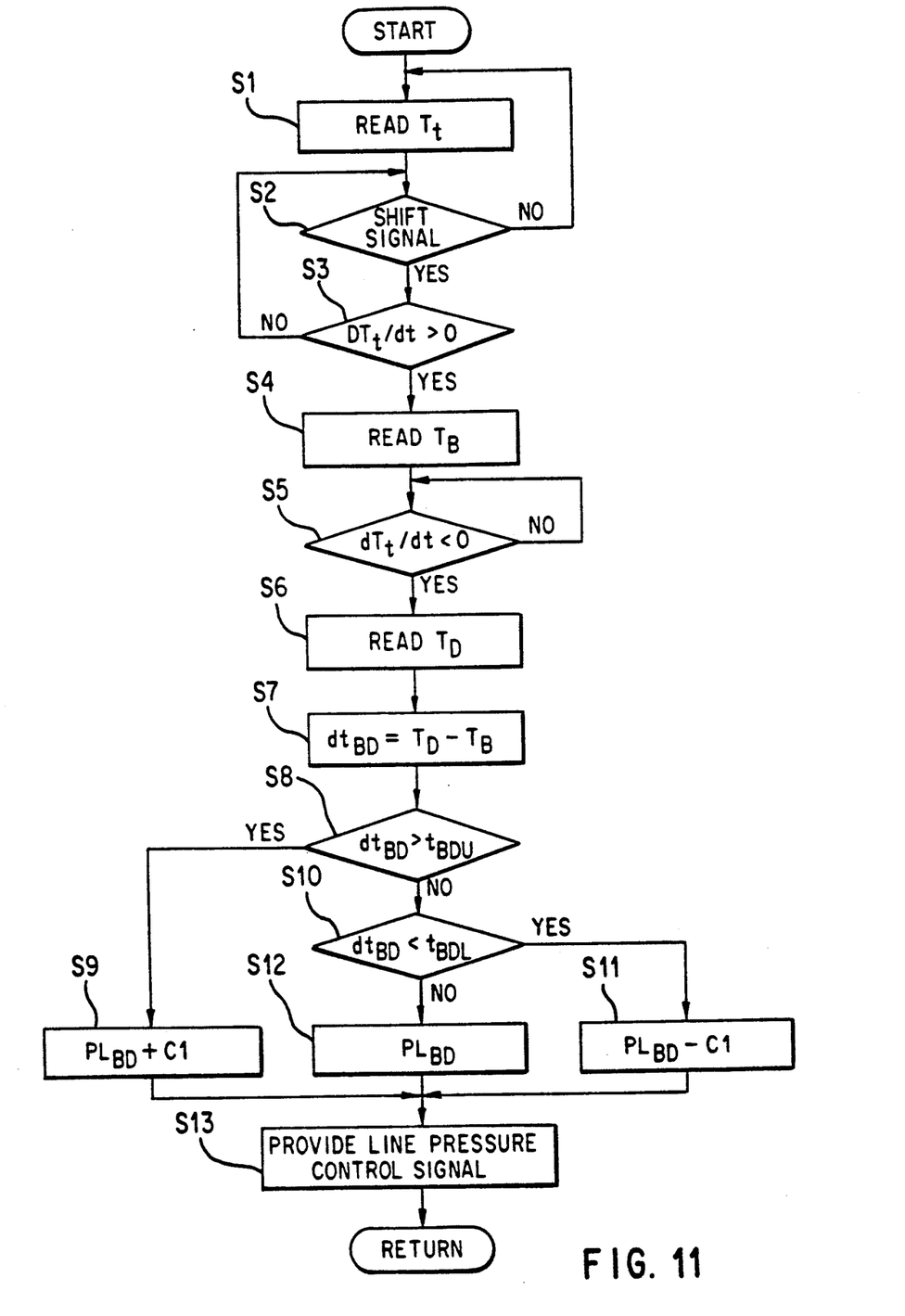
FIG. 11 is a flow chart illustrating an initiation stage line pressure control sequence routine for an initial stage of an automatic shift control for the control unit.

FIG. 11 is a flow chart illustrating a shift shock relief control sequence routine for the microcomputer of the control unit 100 which is conducted to control line pressure in order to keep a duration time $dT_{BD}$ between the start of shifting ($T_B$) and the end of a steep torque decline ($T_D$) within specific allowable limits. After reading a torque $T_t$ provided by the torque sensor TS at step S1, a decision is made at step S2 as to whether or not a shift signal is provided. The shift signal is provided when the automatic transmission 12 needs to shift. As is well known in the art, a necessary shift pattern is automatically determined based on a shift control schedule which has been previously mapped. If in fact a shift signal is provided, a decision is made at step S3 as to whether or not the turbine torque $T_t$ reaches a first inflection point $T_{t1}$. When the answer to the decision made at step S3 becomes "YES," the automatic transmission 12 starts to shift. Then, a time $T_B$ at which the turbine torque $T_t$ reaches the first inflection point $T_{t1}$ is read at step S4. In the same manner, a time $T_D$ at which the turbine torque $T_t$ reaches a second inflection point $T_{t2}$ is read at step S6 when the answer to a decision made at step S5 as to whether or not the turbine torque $T_t$ has reached the second inflection point $T_{t2}$ becomes "YES." A "YES" answer to the decision made at step S5 is provided when a differential value of turbine torque $T_t$ with respect to time t ($dT_t/dt$) becomes negative. This indicates that a steep torque decline in the automatic transmission 12 has ended. Then, a duration time $dT_{BD}$ between the times $T_B$ and $T_D$ is calculated at step S7.

Figure 13:
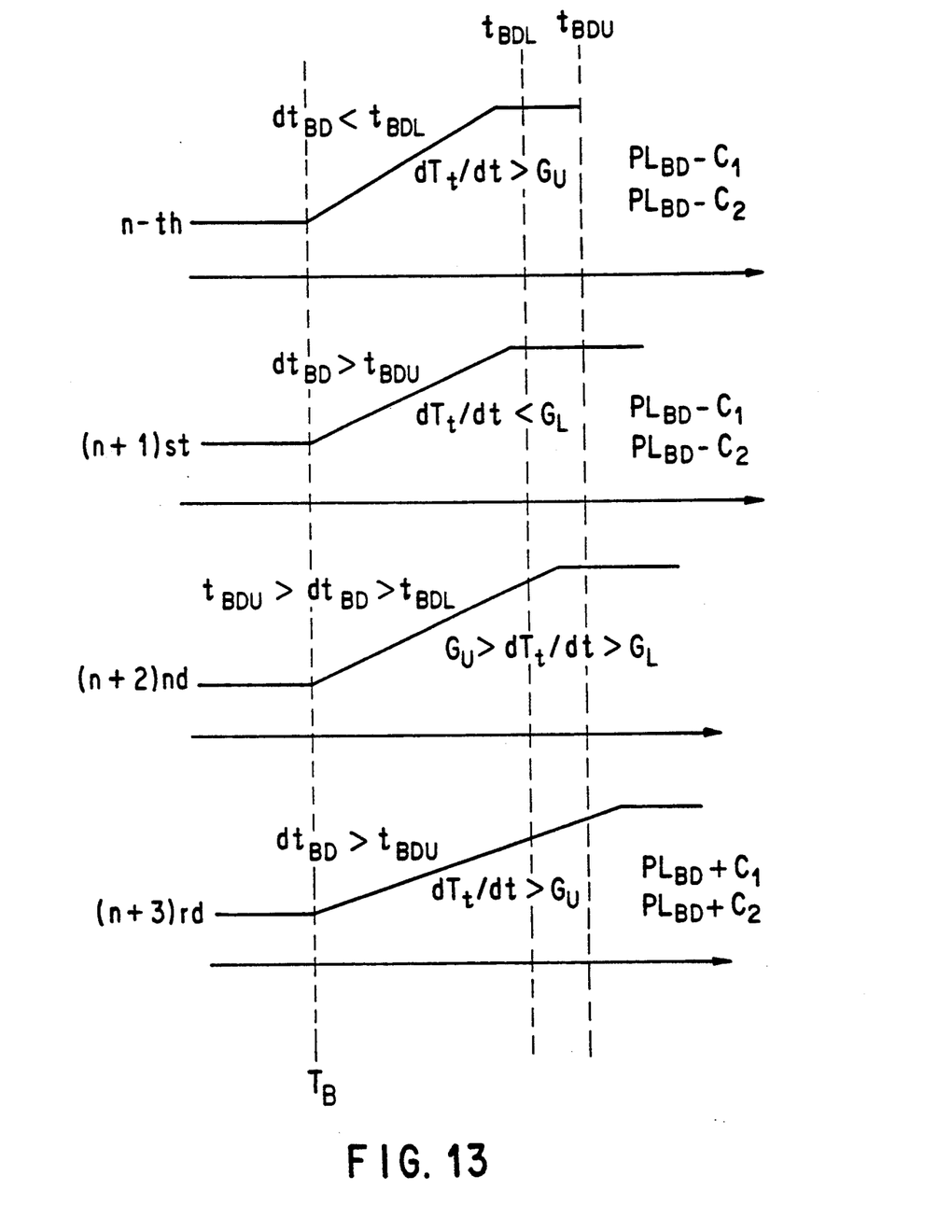

During the duration time $dT_{BD}$, a steep torque decline actually takes place. The line pressure $PL_{BD}$ must be controlled so that the duration time $dT_{BD}$ falls within an allowable range of duration times defined between an upper limit $t_{BDU}$ and a lower limit $t_{BDL}$. For this reason, the duration time $dT_{BD}$ is examined so as to correct line pressure $PL_{BD}$. That is, the duration time $dT_{BD}$ is compared to the upper limit $t_{BDU}$ at step S8. If the duration time $dT_{BD}$ is larger than the upper limit $t_{BDU}$, the turbine torque $T_t$ is changing relatively sluggishly. Then, the line pressure $PL_{BD}$ must be increased by a predetermined value $C_1$ for a next control sequence at step S9. On the other hand, if the duration time $dT_{BD}$ is less than the upper limit $t_{BDU}$, the duration time $dT_{BD}$ is compared to the lower limit $t_{BDL}$ at step S10. If the duration time $dT_{BD}$ is less than the lower limit $t_{BDL}$, the turbine torque $T_t$ has changed relatively rapidly. Then, the line pressure $PL_{BD}$ must be decreased by the predetermined correction pressure $C_1$ for the following control sequence at step S11. If the duration time $dT_{BD}$ is larger than the lower limit $t_{BDL}$, the duration time $dT_{BD}$ is in the allowable range of duration times. Then, the line pressure $PL_{BD}$ is unchanged at step S12. Finally, at step S13, a signal is provided so as to develop the line pressure which was either corrected or kept unchanged at step S9, S11 or S12 for another line pressure control. Correcting the line pressure $PL_{BD}$ by the predetermined correction pressure $C_1$ causes the duration time $dT_{BD}$ to converge with the allowable range of duration times in subsequent control sequences. As shown by a chained line in FIG. 12, the line pressure $PL_{BD}$ changes according to a result of examination of the duration time $dT_{BD}$ relative to the upper and lower allowable range limits of the duration time. For example, as shown in FIG. 13, a change in turbine torque $T_t$ and a change in duration time $dT_{BD}$ vary stepwise from an nth shift operation to an (n+3)rd shift operation.

Figure 14:
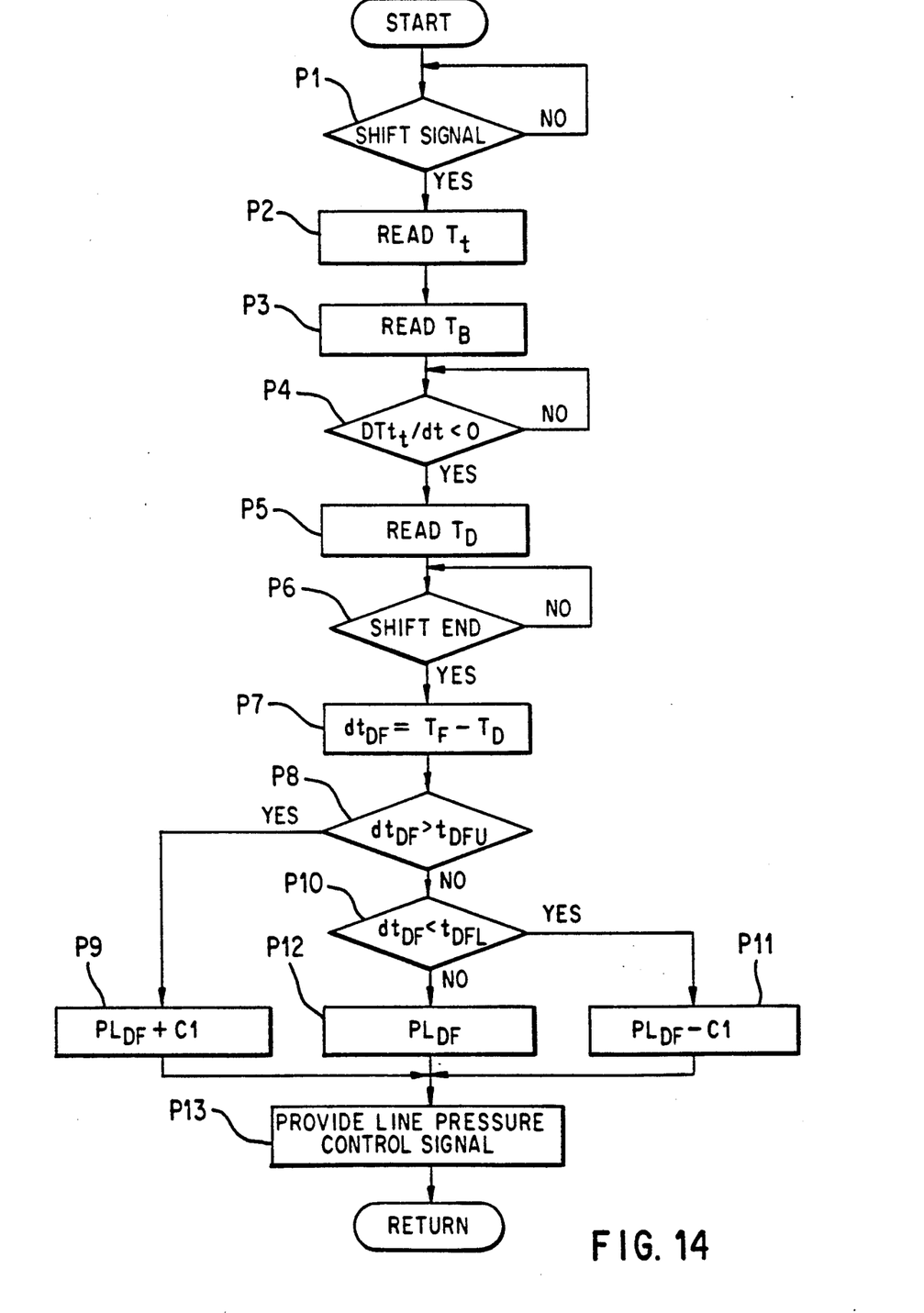
FIG. 14 is a flow chart illustrating a termination stage line pressure control sequence routine for a final stage of an automatic shift control for the control unit.

FIG. 14 is a flow chart illustrating a shift shock relief control sequence routine for the microcomputer of the control unit 100. This routine is conducted to control line pressure in order to keep a duration time $dT_{DF}$ between the end of a steep torque decline ($T_D$) and the end of shifting ($T_F$) within specific allowable limits, and takes place "in parallel" with the shift shock relief control sequence for the duration time $dT_{BD}$ between the start of shifting ($T_B$) and the end of a steep torque decline ($T_D$). When a shift signal is provided and the answer to a decision made at step P1 becomes "YES," after reading a turbine torque $T_t$ provided by the torque sensor TS at step P2 and a time $T_B$ at which the turbine torque $T_t$ reaches the first inflection point $T_{t1}$ at step P3 from the signal processing circuit 6, a decision is made at step P4 as to whether or not the turbine torque $T_t$ has reached the second inflection point $T_{t2}$. When the answer to the decision made at step P4 becomes "YES," indicating that a steep torque decline in the automatic transmission 12 has ended, after reading a time $T_D$ representing the end of the steep torque decline at step P5, a decision is made at step P6 as to whether or not the automatic transmission 12 has completed shifting. This decision is made based on a ratio between an input speed $N_t$ and an output speed $N_p$ of the torque converter 17. When the answer to the decision made at step P6 becomes "YES," after reading a time $T_F$ representing the end of shifting, a calculation is made for a duration time $dT_{DF}$ between the times $T_D$ and $T_F$ at step P7. Thereafter, the duration time $dT_{DF}$ is examined so that a line pressure $PL_{DF}$ is corrected. More specifically, a decision is made at step P8 as to whether or not the duration time $dT_{DF}$ is larger than an upper limit $t_{DFU}$. If the duration time $dT_{DF}$ is larger than the upper limit $t_{DFU}$, the turbine torque $T_t$ has changed at a relatively sluggish rate. The line pressure $PL_{DF}$ then is increased by a predetermined value $C_1$ for the next control sequence at step P9. If, however, the duration time $dT_{DF}$ is less than the upper limit $t_{DFU}$, then the duration time $dT_{DF}$ is compared with a lower limit $t_{DFL}$ at step P10. If the duration time $dT_{DF}$ is less than the lower limit $t_{DFL}$, the turbine torque $T_t$ has changed relatively rapidly. The line pressure $PL_{DF}$ is decreased by the predetermined correction pressure $C_1$ for the following control sequence at step P11. On the other hand, if the duration time $dT_{DF}$ is larger than the lower limit $t_{DFL}$, the duration time $dT_{DF}$ is in the allowable duration time range. In this case, the line pressure $PL_{DF}$ is kept unchanged at step P12. Finally, at step P13, a signal is provided so as to develop the line pressure which is either corrected or maintained at step P9, P11 or P12. Correcting the line pressure $PL_{DF}$ by the predetermined correction pressure $C_1$ causes the duration time $dT_{DF}$ to converge with the allowable range of duration times in subsequent control sequences.

Figure 15:
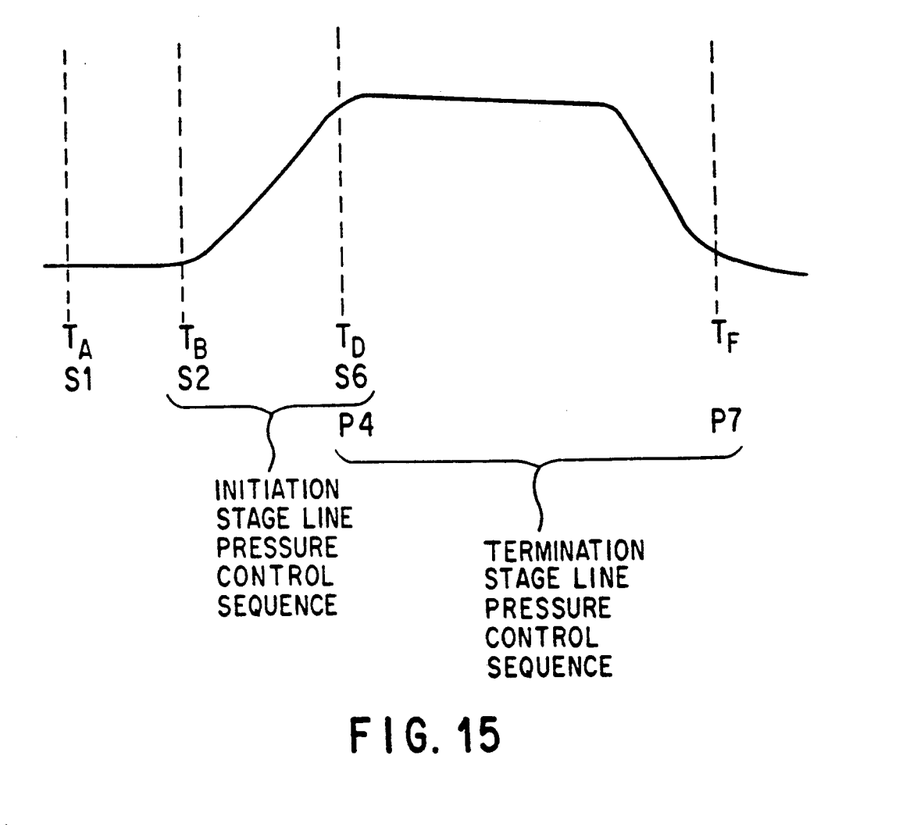
FIG. 15 is an explanatory illustration showing a time relation between the line pressure control sequences of FIG. 11 and 14.

As FIG. 15 shows, the shift shock relief controls of FIGS. 11 and 14 are conducted "in parallel," i.e., simultaneously, in each shift operation of the automatic transmission 12. More precisely, the control steps S4 to S6 of FIG. 11 take place in a period between the times $T_B$ and $T_D$, and the control steps P4 to P7 of FIG. 14 take place in a period between the times $T_D$ and $T_F$. However, signals representing the line pressure $PL_{BD}$ and the line pressure $PL_{DF}$ are independent from each other. Consequently, the controls of FIGS. 11 and 14 affect each other even though they are simultaneously conducted in each shift operation of the automatic transmission 12.

Figure 16:
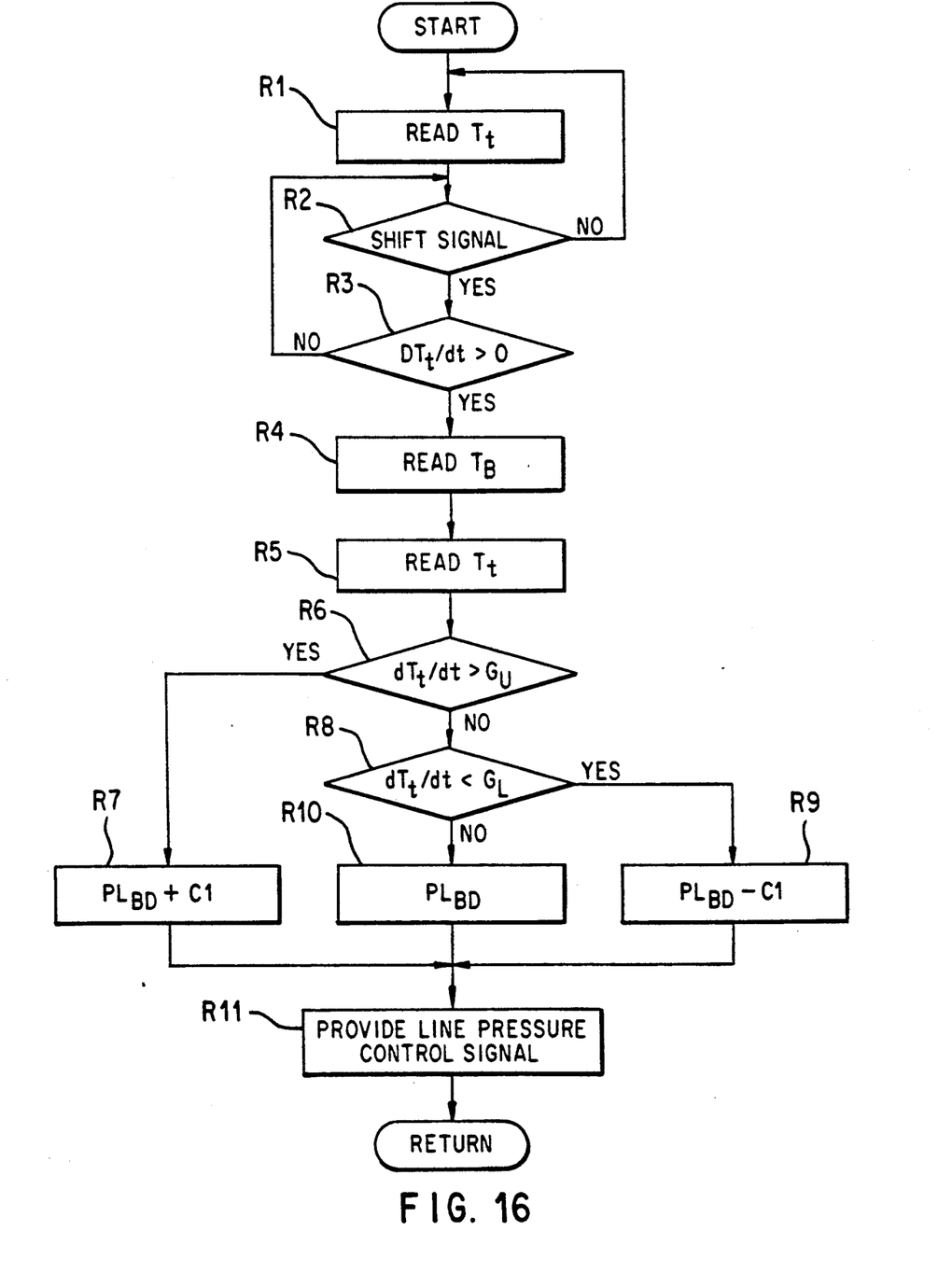
FIG. 16 is a flow chart illustrating a variation of the initiation stage line pressure control sequence routine shown in FIG. 11.

The shift shock relief control sequence routine of FIG. 11 controls a line pressure in order to keep a duration time $dT_{BD}$ between the initiation of shift $T_B$ and the end of torque decline ($T_D$). The routine shown in FIG. 11 may be varied as shown in FIG. 16. That is, the steps S4 to S12 of the sequence shown in FIG. 11, which regulate a line pressure $PL_{BD}$ so that a duration time $dT_{BD}$ stays between the initiation of shift $T_B$ and the end of torque decline ($T_D$) falls within a predetermined limits, are replaced with steps R4 to R10, through which a line pressure $PL_{BD}$ is regulated so that a gradient of change in turbine torque $T_t$ between predetermined upper and lower limits $G_U$ and $G_L$. Adjusting a gradient of change in turbine torque $T_t$ is allowed because a turbine torque $T_t$ changes smoothly.

It is to be understood that although a specific preferred embodiment of the present invention has been described, various other embodiments and variants may occur to those skilled in the art. Any such other embodiments and variants which fall within the scope and spirit of the invention are intended to be covered by the following claims.

What is claimed is:

1. A shift control system for hydraulically operating an automatic transmission to shift in predetermined shift patterns according to vehicle operating conditions, said shift control system comprising:

hydraulic pressure control circuit means for providing a shift initiation line pressure and a shift termination line pressure to cause the automatic transmission to shift according to a specific pattern; and control means for detecting an initiation of shifting said automatic transmission according to said specific pattern of shifting and a termination of a decline in output torque of the automatic transmission, and for correcting said shift initiation line pressure so that a duration between said initiation of shifting of said automatic transmission according to said specific pattern and said termination of said decline in output torque falls within a predetermined shift initiation time period in a following shift control of the automatic transmission.

2. A shift control system as defined in claim wherein said control means includes torque detecting means for detecting one of an input torque and an output torque of the automatic transmission while the automatic transmission performs said shift according to said automatic transmission according to said specific pattern so as to detect said initiation of said specific pattern of shift and said termination of said decline in output torque based on a change in a torque detected by said torque detecting means.

3. A shift control system as defined in claim wherein said control means detects a shift initiation time, at which said initiation of shifting of said automatic transmission according to said specific pattern takes place, and a decline termination time, at which said termination of said decline in output torque takes place, and calculates said duration as being a time difference between said decline termination time and said shift initiation time.

4. A shift control system as defined in claim 3, wherein said control means includes torque detecting means for detecting an input torque of the automatic transmission while the automatic transmission performs said shift according to said specific pattern and controls said shift initiation line pressure so that a change rate of an input torque detected by said torque detecting means falls within predetermined limits, thereby making said duration fall within said predetermined shift initiation time period.

5. A shift control system as defined in claim 4, wherein said torque detecting means detects torsion of an input shaft of the automatic transmission, based on which an input torque of the automatic transmission is calculated.

6. A shift control system as defined in claim 5, wherein said input shaft comprises a turbine shaft of a torque converter.

7. A shift control system as defined in claim wherein said control means further detects a termination of shifting of said automatic transmission according to said specific pattern and corrects said shift termination line pressure so that a duration between said termination of a decline in output torque and said termination of shifting of said automatic transmission according to said specific pattern falls within a predetermined shift termination time period in said following shift control of the automatic transmission.

* * * * *